United States Patent
Herzer et al.

(10) Patent No.: US 8,310,221 B2
(45) Date of Patent: Nov. 13, 2012

(54) ELECTRONIC DEVICE AND METHOD FOR DC-DC CONVERSION WITH SLOPE COMPENSATION

(75) Inventors: Stefan Herzer, Ilmenau (DE); Sumeet P. Kulkarni, Munich (DE); Jochen Neidhardt, Munich (DE); Maciej Jankowski, Munich (DE)

(73) Assignee: Texas Instruments Deutschland GmbH, Freising (DE)

( * ) Notice: Subject to any disclaimer, the term of this patent is extended or adjusted under 35 U.S.C. 154(b) by 283 days.

(21) Appl. No.: 12/752,853

(22) Filed: Apr. 1, 2010

(65) Prior Publication Data

US 2010/0253313 A1    Oct. 7, 2010

(30) Foreign Application Priority Data

Apr. 3, 2009   (DE) .................. 10 2009 016 290

(51) Int. Cl.
*G05F 1/00* (2006.01)
(52) U.S. Cl. ...................................... 323/283; 323/288
(58) Field of Classification Search .................. 323/222, 323/283, 288
See application file for complete search history.

(56) References Cited

U.S. PATENT DOCUMENTS

| | | | |
|---|---|---|---|
| 4,975,820 A | 12/1990 | Szepesi | |
| 6,177,787 B1 | 1/2001 | Hobrecht | |
| 7,126,318 B2 | 10/2006 | Oswald et al. | |
| 7,265,530 B1 | 9/2007 | Broach et al. | |
| 7,876,073 B2* | 1/2011 | Sohma | 323/222 |
| 2008/0150508 A1* | 6/2008 | Sohma | 323/283 |
| 2009/0080227 A1 | 3/2009 | Nakahashi | |
| 2009/0302820 A1* | 12/2009 | Shimizu et al. | 323/285 |
| 2011/0043175 A1* | 2/2011 | Sohma | 323/282 |

OTHER PUBLICATIONS

DE Search Report, dated Dec. 14, 2009.

* cited by examiner

*Primary Examiner* — Shawn Riley
(74) *Attorney, Agent, or Firm* — William B. Kempler; Wade J. Brady, III; Frederick J. Telecky, Jr.

(57) ABSTRACT

An electronic device is provided which comprises circuitry for DC-DC conversion configured to switch an inductor current through an inductor using slope compensation, wherein the circuitry comprises a slope compensation stage configured to generate a slope compensation signal as a function of an switching frequency of the DC-DC conversion and an input voltage of the DC-DC converter.

10 Claims, 7 Drawing Sheets

ELECTRONIC DEVICE AND METHOD FOR DC-DC CONVERSION WITH SLOPE COMPENSATION

CROSS-REFERENCE TO RELATED APPLICATIONS

This patent application claims priority from German Patent Application No. 10 2009 016 290.9, filed Apr. 3, 2009, which is incorporated herein by reference in its entirety.

FIELD OF THE INVENTION

The present invention relates to an electronic device with circuitry for DC-DC conversion and a method.

BACKGROUND OF THE INVENTION

DC-DC converters have two basic control mechanisms: voltage and current control. Although the advantages of current-mode control over conventional voltage mode control have often been demonstrated, the typical peak-sensing current mode converter has several drawbacks. Peak-sensing converters usually show inherent open loop instability above 50% duty cycle, a non-ideal loop response, a tendency towards subharmonic oscillation and noise sensitivity when the inductor ripple is small. Most or all of these problems can be reduced or even overcome with a technique referred to as slope compensation.

FIG. 1 shows simplified circuit diagram of a DC-DC step down converter using peak current sensing in a current control mode. There is a power switch S1 (e.g. a NPN bipolar transistor), and inductor L, a diode D, a capacitor C and a load RL. The collector of bipolar transistor S1 is coupled to receive primary input voltage VI, which may be provided by a battery. The emitter of power switch S1 is coupled to a cathode of diode D and inductor L. When S1 is turned on, the inductor current IL through inductor L increases. When power switch S1 is turned off, the inductor current IL is supplied through diode D, but decreases slowly. Capacitor C serves as buffer capacitor. The behavior of inductor current IL is also shown in the small diagram.

There are two control loops, one for the output voltage VO and one for the inductor current IL. VO is compared with a reference voltage VREF in error amplifier AMP which provides an error signal VE. A slope compensation voltage VC is subtracted from VE and the resulting voltage VX is fed to a negative input of comparator COMP. The positive input of comparator COMP receives a voltage VS that is proportional to the inductor current IL. Comparator COMP serves to implement a peak current sensing mechanism. If IL exceeds a maximum value, the output of comparator COMP turns to low. The output of comparator COMP is coupled to the reset input R of an RS latch L1. A logic low level on input R sets the output of latch L1 to low and the power switch S1 is turned off. This provides that IL decreases. An oscillator OSC provides pulses of a period T to set input S of RS-latch L1. A pulse on set input S turns the output of latch L1 to high and the power switch S1 is switched on until both inputs R and S are again low. The current IL increases until VS exceeds VX and S1 is turned off again. The compensation voltage VC provides that VX is drops linearly for a constant VE over period T. The maximum voltage step of VC is A.

FIG. 2 shows two waveforms illustrating the need for slope compensation in general. The inductor current IL, for example IL of the prior art current mode DC-DC converter shown in FIG. 1 without a compensation voltage VC, is shown for two different duty cycles D=TON/TS. In the upper diagram, the duty cycle is smaller than 50% (duty cycle D<0.5). The rising slope mr is therefore steeper than the falling slope mf of the inductor current IL. The solid line IL is the ideal current and the dashed line a more realistic current. Even for a significant initial deviation of the real current IL from the ideal curve, the deviation is damped out over several cycles, i.e. the first deviation ΔI1 is greater than the second deviation ΔI2 which is greater than the third deviation ΔI3. In order to comply with the units of the diagram the deviations may be interpreted as ΔI1*RS, ΔI2*RS, or ΔI3*RS. The diagram below shows the same situation for a duty cycle D greater than 50% (duty cycle>0.5). Here, the falling slope mf is steeper than the rising slope mr. Now the deviation from the ideal curve increases, i.e. ΔI1<ΔI2<Δ3. This situation can lead to instability. For the peak current control step down converter, disturbances of current IL are only damped out for duty cycles below 50%.

FIG. 3 shows the inductor current IL for the circuit shown in FIG. 1 with slope compensation voltage VC. Voltage VX decreases linearly over period TS. This reduces the maximum admissible peak current for inductor current IL. Although the duty cycle is smaller than 50%, the deviation from the ideal curve is damped out. Performing linear slope compensation as shown in FIG. 3 can be regarded as changing rising slopes mr and falling slopes mf of the sensed inductor current. The rising slope is pushed towards greater values (i.e. it is made steeper) and the falling slope is pushed toward lower value (i.e. it is made flatter).

The compensation slope is a function of the input voltage VI, the output voltage VO, and the inductor L. Furthermore, DC-DC converters are operated at several different and even varying operation frequencies. The amount of slope compensation depends on static design choices (frequency FS=1/TS, inductance L of inductor) and varying conditions as VI and the duty cycle D=TON/TS.

Some prior art DC-DC converters select the amount of slope compensation conservatively with regard to worst case system parameters. This is sub-optimal as the converter is driven in voltage mode control which makes outer loop stability problematic and counteracts the benefits of primarily using current mode control. Too large slope compensation values limit the inductor current capability or require an additional mechanism for raising the current limit.

Although slope compensation is theoretically only needed for duty cycles greater 50%, most prior art devices use compensation also below 50% in order to compensate production spread and to ensure signal integrity.

SUMMARY OF THE INVENTION

It is a general object of the present invention to provide an electronic device and a method for DC-DC conversion that uses slope compensation and which is applicable to different static design choices and varying operating conditions without unduly limiting current capability or impairing the inherent advantages of current mode control.

In one aspect of the invention, an electronic device is provided which comprises circuitry for DC-DC conversion. The electronic device is configured to switch an inductor current through an inductor using slope compensation. The circuitry comprises a slope compensation stage configured to generate a slope compensation signal as a function of the switching frequency of the DC-DC conversion and the input voltage of the DC-DC converter. This aspect of the invention provides that not only the switching frequency but also the input voltage level are considered for determining the appropriate slope compensation.

The slope compensation stage may further be configured to generate the slope compensation signal for compensating all duty cycles of the DC-DC conversion. The slope compensation signal may then be a function of the expected variation of duty cycles for a specific design. These aspects of the invention provide a robust and accurate way of generating optimal slope compensation over a wide range of static and external conditions.

In an aspect of the invention, the switching frequency may advantageously be derived from a current of an oscillator. This oscillator current may advantageously be a current which is a function of the oscillating frequency of the oscillator. The oscillating frequency may then advantageously be the switching frequency of the DC-DC conversion. This provides a very efficient and robust way of providing a signal which indicates the switching frequency of the DC-DC conversion.

The slope compensation stage may then be configured to adjust a resistor value in response to a magnitude of the oscillator current so as to provide an adjusted resistor. This can also be considered as an implementation of a current to resistance converter. The electronic device may therefore comprise a current to resistance converter. The adjustment of the resistance of the resistor may advantageously be performed digitally by connecting, disconnecting and/or shorting out resistors of a plurality of resistors so as to provide a total resistance which is a function (e.g. a linear function) of the oscillator current.

A window comparator may be used for monitoring a voltage drop across the resistor for adjusting the resistance. The output signal of the comparator may then be processed in a digital logic which provides configuration signals to a plurality of resistors, which may then be coupled so as to provide a total resistance which is a linear function of the oscillator current.

The adjustment of the resistors through the digital logic may advantageously be performed according to a 1/x function. This provides that the approximation of the final resistance value is optimized if the current from the oscillator linearly changes with the switching frequency.

A digital value for adjusting the resistor may then be used to also adjust another resistor. The second resistor may then have the same resistance as the first resistor. The resistors may be configured to match. The second resistor may then be coupled to generate a current which is a function of the switching frequency.

The compensation stage may also include a voltage follower coupled with the adjusted resistor and configured to control a ramp current through the adjusted resistor in response to the input voltage. The voltage follower may therefore include a transistor which is coupled with a channel in series to the adjusted resistor. A control gate of the transistor may then be controlled with a operational amplifier coupled as voltage follower so as to control with the transistor a current through the adjusted resistor in response to the input voltage. The adjusted resistor may then advantageously be the second resistor having the same resistance as the first resistor. The second resistor and the transistor of the voltage follower may then be coupled in series, such that a current through the resistor is a function of the input voltage and the switching frequency. The compensation signal may then be generated using the current. This is an efficient and flexible way to provide that the compensation signal is a function of the input voltage and switching frequency.

The slope compensation signal may further be generated by charging a capacitor with a current. The current may be (or a function of) the current generated with the second resistor and the voltage follower. A plurality of current sources may be provided. Each of the current sources may be configured to provide a current which is function of a ramp current. The ramp current may be a function of the switching frequency and the input voltage. The ramp current may advantageously be the current which is generated with the second resistor and the voltage follower.

The integration may be performed by switching the current sources individually for charging the capacitor. The switching may be performed within a single period of the switching frequency. The period of the switching frequency may be divided into sub-cycles in accordance with the number of current sources. The capacitor may be charged with a constant current during the first sub-cycles. Thereafter, a current source may be switched on and kept on during each sub-cycle. This provides a piecewise linear behavior of the voltage level on the capacitor, which may then be used as the slope compensation signal.

An aspect of the invention also provides a method of operating a DC-DC converter. A current may be switched through an inductor in accordance with a switching frequency. A slope of the current through the inductor may be compensated with a compensation signal. The compensation signal may then be a function of a switching frequency of the DC-DC converter and the input voltage of the DC-DC converter. The compensation signal may also be configured to compensate the varying duty cycles (i.e. for example all the duty cycles for a specific design).

The electronic device and the methods according to the invention provide robust and accurate solutions for generating optimal slope compensation over a wide range of external conditions. Compared with prior art DC-DC converters using bipolar multipliers or high voltage op-amp, the present invention is less complex and saves chip area. The embodiments of the invention also provide high flexibility and configurability as the slope compensation may be adjusted through digital signals.

BRIEF DESCRIPTION OF THE DRAWINGS

Further aspects of the invention will ensue from the description herein below of preferred embodiments of the invention with reference to the accompanying drawings, wherein.

DESCRIPTION OF THE EMBODIMENTS

Figure 4:
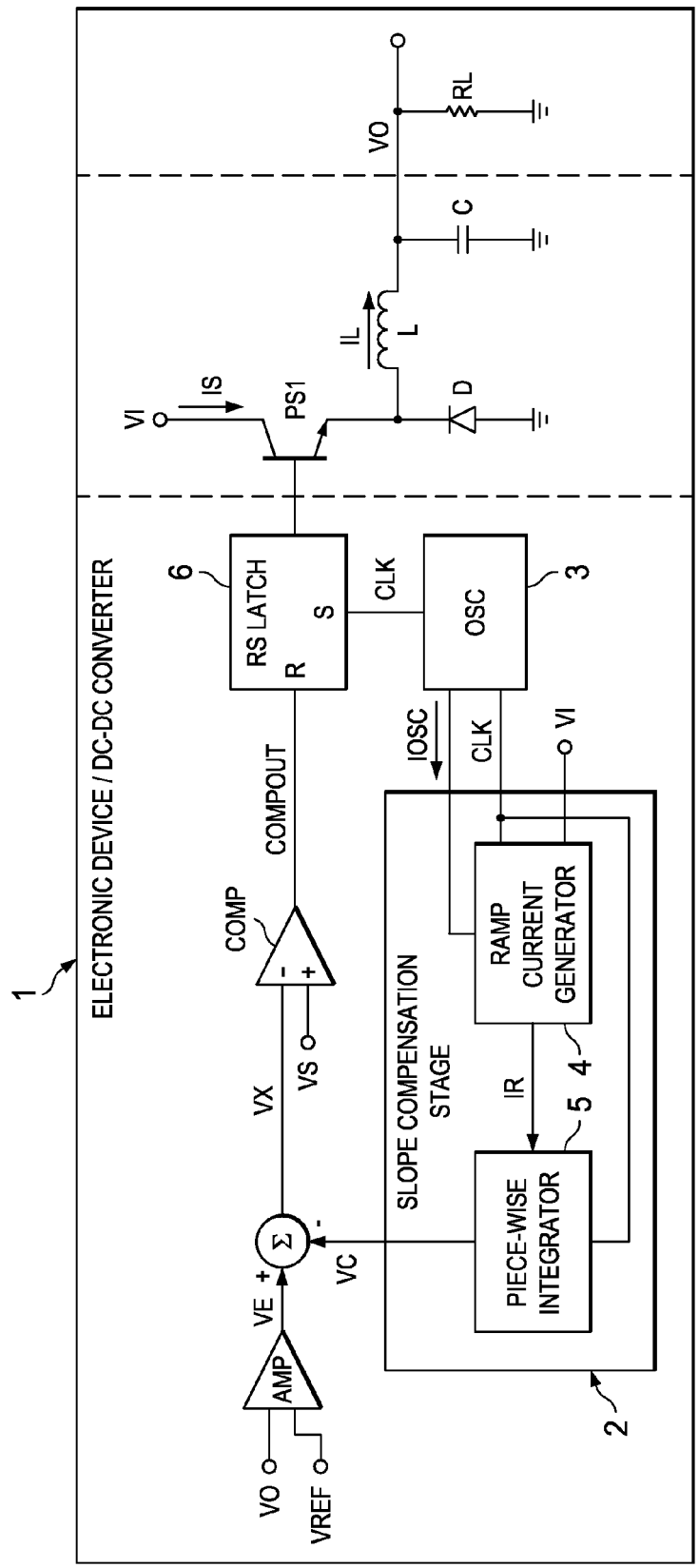
FIG. 4 shows a simplified circuit diagram of an electronic device for DC-DC conversion according to an embodiment of the invention.

FIG. 4 shows a simplified circuit diagram of an embodiment of the invention. The dashed lines suggest different configurations for integrated and external components if the electronic device is—at least partially—implemented as an integrated circuit. In one embodiment, even the load may be integrated. In other embodiments, the load may be an external component. In another embodiment, the integrated circuit may be configured to include all necessary components to provide the control signals for the power transistor or several power transistors. Other configurations are conceivable.

The error amplifier AMP provides an error voltage VE by comparing the output voltage VO with a reference voltage VREF. A slope compensation VC is generated with slope compensation stage 2, which is implemented in accordance with aspects of the invention. For example, the input voltage may vary from 4V-40V and the frequency may vary between 150 KHz and 600 KHz. This may entail up to 100 times variation in the required slope compensation.

The inductor current IL, or rather IL multiplied with a sense resistor value RS may have a rising slope mr and a falling slope mf. The parameter mc may then be the slope of the compensation signal. In this situation mc can be chosen as:

$$mc \geq \frac{|mf| - mr}{2}$$

with $mf = -VO/L$ and $mr = (VI - VO)/L$ $$mc \geq \frac{VO - VI}{2L} = \frac{VI}{L}(D - 0.5)$$

where D=VO/VI for buck converters.

Generally, fixed frequency current-mode controlled DC-DC converters require slope compensation for stabilizing the current loop for duty ratios greater than 50% for peak current control and lower than 50% for valley current control. The aspects of the invention may therefore be advantageously applied to current fixed frequency current-mode DC-DC converters. The duty cycles have to be considered with respect to manner of control, i.e. peak or valley and the type of converter, i.e. buck or boost. The respective modifications to the above and below formulas are then straightforward for the person skilled in the art in order to apply them to a different type of DC-DC converter or current-mode control. The embodiments herein relate to a buck converter with peak current control but the aspects also apply to other kinds of DC-DC converters.

In this embodiment slope compensation may be started below 50%, for example at 30%. The slope mc may then be $$mc = \frac{VI}{L}(D - 0.3)$$

with D(t)=t/TS, where TS=1/FS and FS is the switching frequency of the DC-DC converter. The value 0.3 is also a variable and may change as explained above. A design parameter and operating condition parameter KFL may be defined as KFL=(FS*L)/RS. The time dependent slope mc(t) of the compensation signal may then be:

$$mc(t) = \frac{VI\ FS}{KFL\ RS}\left(\frac{t}{TS} - 0.3\right) fcr\ t \geq 0.3TS$$

and $$mc(t) = 0\ fcr\ t < 0.3TS$$

In order determine the required slope compensation signal VC(t), the slope has to be integrated $$VC(t) = \frac{VI\ FS}{KFL\ RS}\left[\int_{0.3TS}^{L}\left(\frac{t}{TS} - 0.3\right)dt\right]$$

$$VC(t) = \frac{VI\ FS}{KFL\ RS}\frac{TS}{2}\left(\frac{t}{TS} - 0.3\right)^2$$

$$= \frac{VI\ FS}{2KFL\ RS}\left(\frac{t}{TS} - 0.3\right)^2$$

The embodiment of the invention of FIG. 4 may implement the above equation or more generally $$VC(t) = \frac{VI\ FS}{2KFL\ RS}\left(\frac{t}{TS} - x\right)^2$$

where x is a parameter of choice for example between 0 and 50% for setting the starting point (a point of time within a period TS, a threshold) of the slope compensation. This may also be defined as $$VC(t) = \frac{VI\ FS}{2KFL\ RS}\left(\frac{t}{TS} - \frac{i}{M + i}\right)^2$$

where M and i are variables, for example positive integer values (M>1, i≧0). M may then indicate a number of piecewise linear approximation sections of the linear quadratic function, and i may represent clock cycles of a clock with period TM=TS/(M+i) during which the compensation does not yet start. Further details of M and i are explained below. The parameter i may then be considered a threshold value for defining when the quadratic slope compensation should start. Advantageous embodiments may chose i>1, for example i=3 and M=7.

Although, this embodiment focuses on a buck converter or step down converter, similar considerations easily apply to boost converters with a slightly different relationship between VI and VO.

Figure 1:
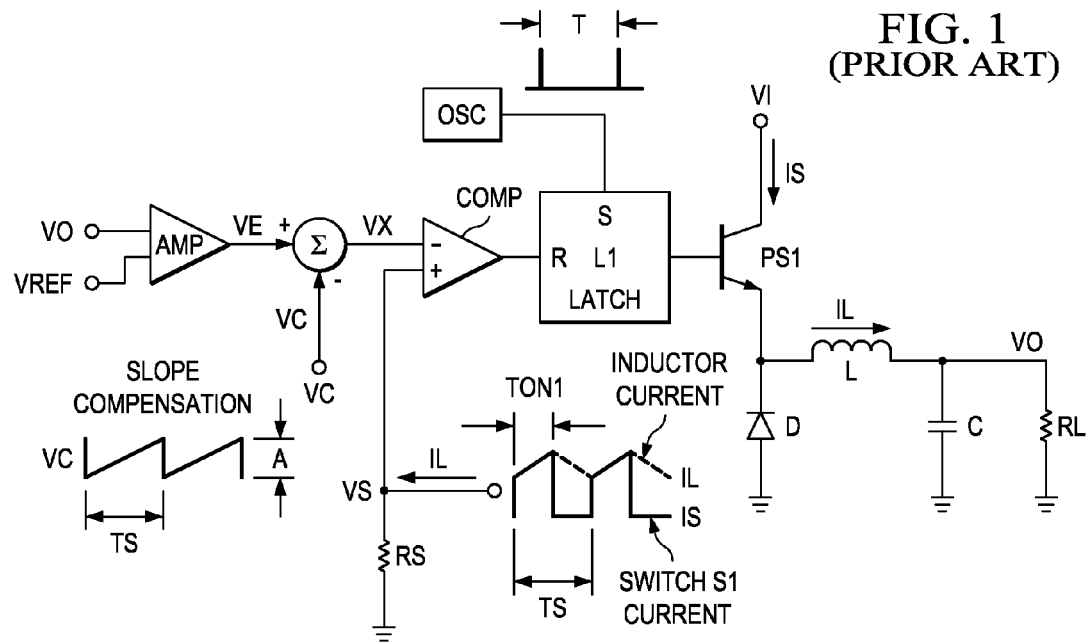
FIG. 1 shows a DC-DC converter according to the prior art with peak current sensing and slope compensation.

In this embodiment, the slope compensation voltage VC may be subtracted from an error voltage VE so as to provide a difference voltage VX, which is then fed to comparator COMP (VX=VE−VC). Comparator COMP performs peak current control and compares VX with input voltage VS, which can be a linear function of the inductor current IL through the inductor L. Peak current sensing can be performed as illustrated in FIG. 1 using a sense resistor RS which receives the inductor current IL (i.e. VS=IL*RS).

Figure 2A:
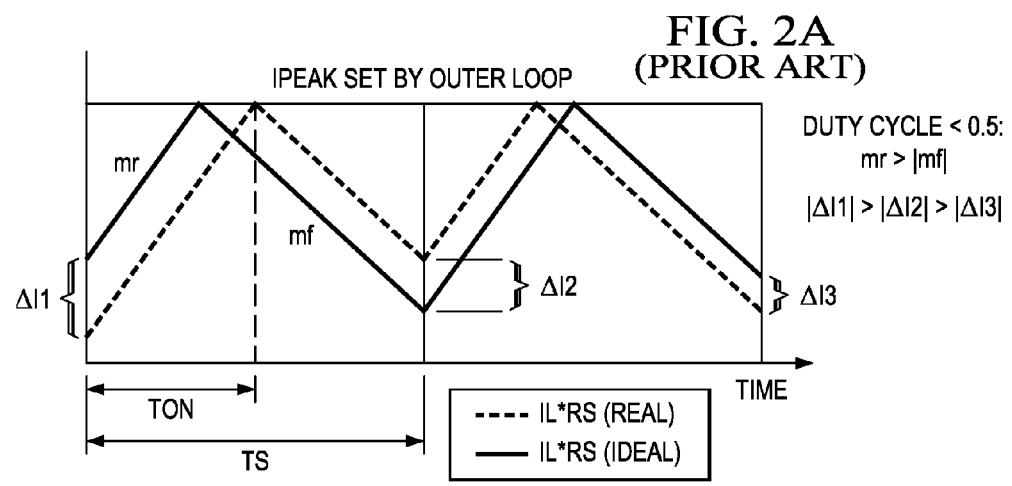
FIG. 2 shows waveforms of inductor current in a prior art DC-DC converter without slope compensation.
Figure 2B:
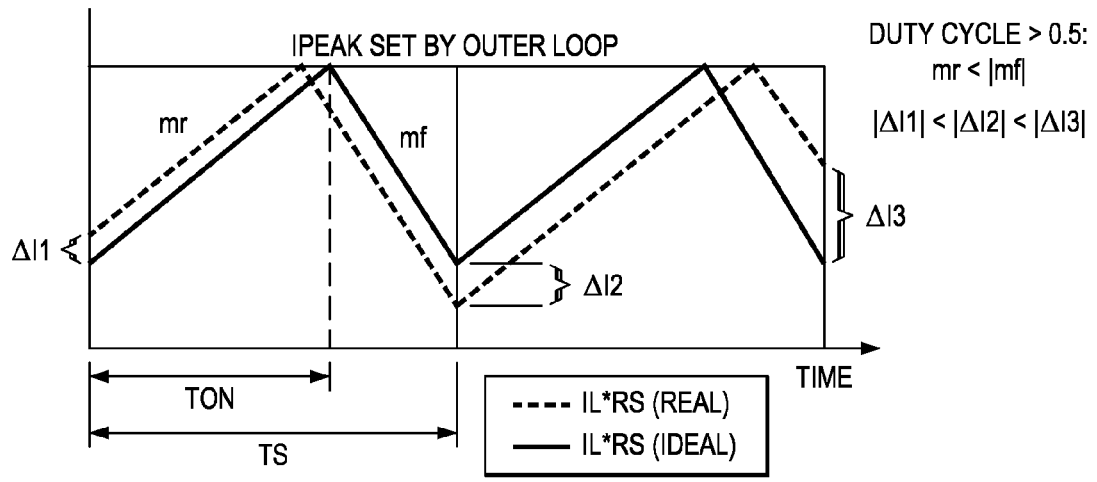
Figure 3:
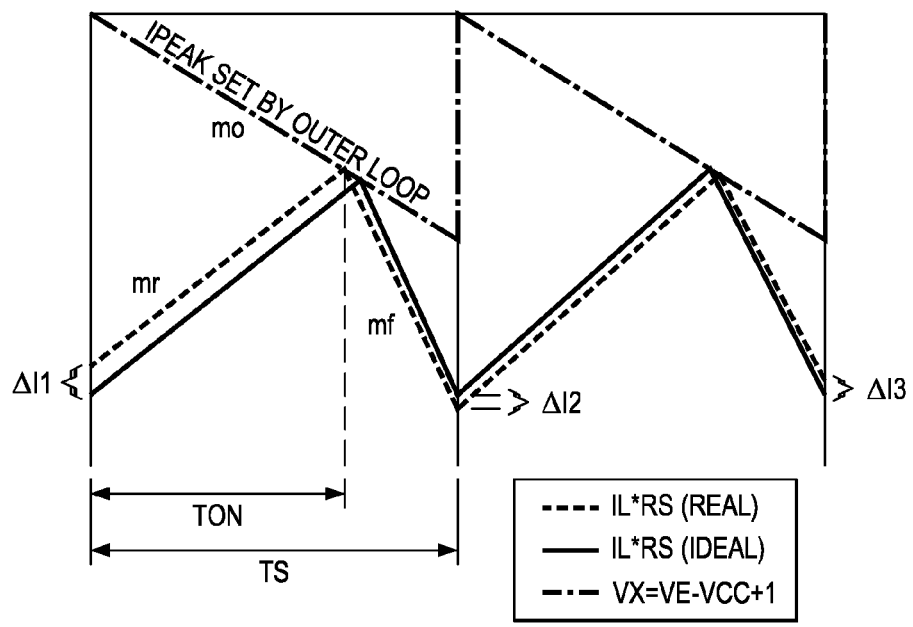
FIG. 3 shows waveforms of an inductor current in a prior art DC-DC converter with a prior art slope compensation.

The comparator output signal COMPOUT is passed to the reset input R of an RS latch 6. The set input of RS latch 6 receives a clock signal CLK from oscillator OSC 3 having switching frequency FS (FS=1/TS). The RS latch 6 may drive a power transistor PS1 which is coupled to receive the input voltage VI. Inductor L, diode D, capacitor C and resistor RL may operate as explained with respect to FIG. 1. Due to the switching of power transistor PS1, the current IL through inductor L rises and falls approximately linearly as explained with respect to FIG. 2 and FIG. 3. A peak current sensing mechanism for current IL is implemented with comparator COMP and, for example a shunt resistor (RS not shown), which serves to switch transistor PS1 on and off when the magnitude of IL reaches upper and lower maximum values (peaks and valleys).

According to an aspect of the invention, a current IOSC can be supplied from oscillator OSC 3 to slope compensation stage 2. Current IOSC can then be a function of the switching frequency FS:

$$IOSC = KOSC \cdot FS$$

where KOSC is a design parameter which relates to the specific implementation of oscillator OSC 3.

Current IOSC can be used for generating a ramp current IR with ramp current generator 4. In this embodiment, IR may then be a function of the frequency FS and of the input voltage VI:

$$IR = \frac{KVIN \; VI \; KOSC \; FS}{VREFR}$$

where KVIN may be a variable or constant gain, damping or amplification factor for VI, and VREFR is a reference voltage, which may be the mean value of VREF1 and VREF2.

The ramp current IR may then be passed to piecewise linear integrator 5, which integrates IR with respect to the duty cycle D in a piecewise linear manner. The result is piecewise linear approximation of the optimum slope compensation voltage VC in accordance with the above equations.

Figure 5:
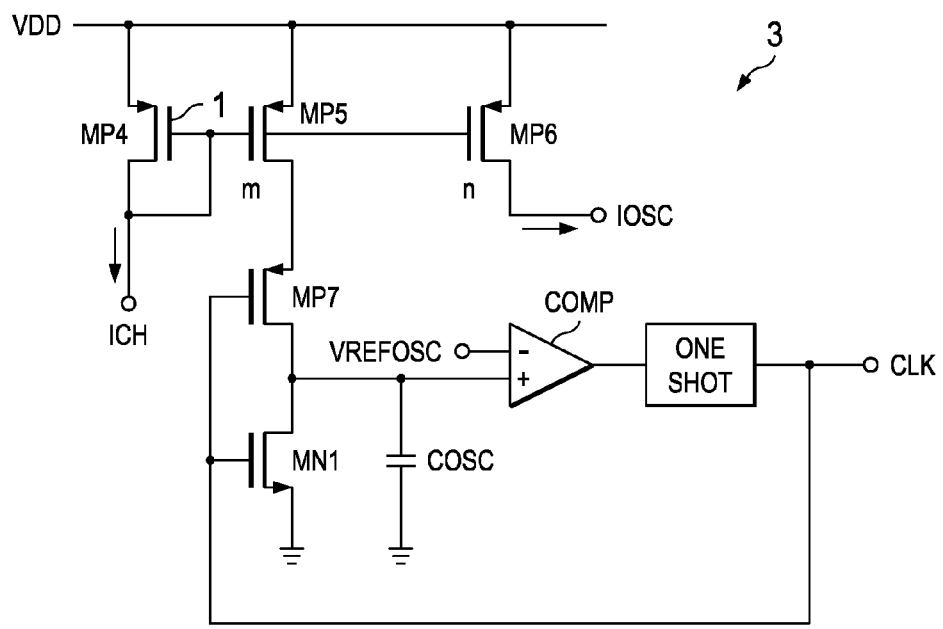
FIG. 5 shows a simplified circuit diagram of an oscillator that may be used in the embodiment of FIG. 4.

FIG. 5 shows a simplified circuit diagram of an embodiment of an oscillator OSC 3. In order to provide a periodic clock signal CLK an oscillator capacitor COSC is periodically charged and discharged. A charging current ICH defines the magnitude of the charging current and therefore the switching frequency FS or period TS=1/FS of the clock signal CLK. Charging current ICH is mirrored through current mirror MP4, MP5 with ratio 1:m to transistor MP7 which is coupled to supply oscillator capacitor COSC with a current that can be m times the charge current ICH. Comparator COMP monitors the voltage on capacitor COSC and compares the voltage level with an oscillator reference voltage VREFOSC. The switching frequency FS may therefore be determined as $$FS = \frac{ICH \cdot m}{COSC \cdot VREFOSC}$$

The output of comparator COMP is coupled to a one shot logic, the output of which is the periodic clock signal CLK of frequency CLK. The clock signal CLK is used to switch transistors MP7 and MN1. If the reference voltage level VREFOSC is reached, MN1 is turned on and capacitor is discharged. Charge current ICH is also mirrored through current mirror MP4, MP6 with a ratio 1:n so as to provide oscillator current IOSC, which is a function of the switching frequency FS $$IOSC = \frac{n}{m} VREFOSC \; FS \; COSC$$

This provides that the oscillator current IOSC is generally proportional to the switching frequency FS according to relationship:

$$IOSC \propto FS \; COSC$$

In this embodiment of the invention, this relationship is used and current IOSC is further processed for finally receiving VC.

Figure 6:
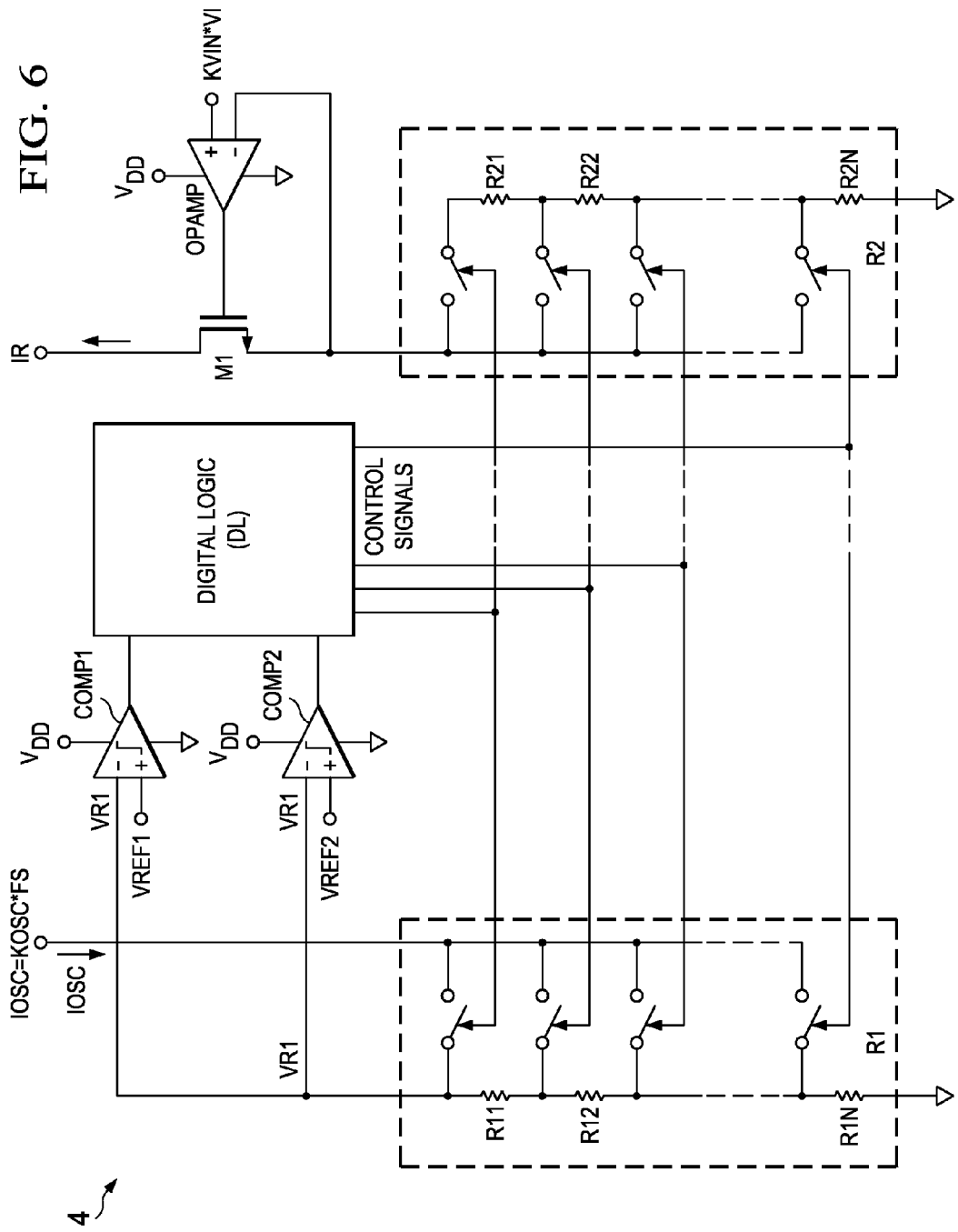
FIG. 6 shows a simplified circuit diagram of a ramp current generator that may be used in the embodiment of FIG. 4.

FIG. 6 shows a simplified circuit diagram of an embodiment of a ramp current generating stage 4. The ramp current stage generates an output signal, here a ramp current IR, which is a function of the switching frequency FS of the DC-DC converter and the input voltage VI of the DC-DC converter.

The oscillator current IOSC, which is a function of the switching frequency FS, is passed to a series of resistors R11 to R1N. The series of resistors may consist of a plurality of unity resistors. The total resistance R1 of the series is configurable through a digital logic DL. The digital logic DL receives output signals from two comparators COMP1 and COMP2 which compare the voltage drop VR1=R1*IOSC with a first reference voltage VREF1 and a second voltage reference VREF2. The two comparators COMP1, COMP2 may implement a window comparator and the logic DL provides that the series of resistors R11 to R1N is adjusted so as to place VR1 between VREF1 and VREF2. This part of the circuit provides that current IOSC is transformed in a resistance value R1. Therefore, this can be considered as voltage to resistance converter. A second series of resistors R21 to R2N is provided which is coupled so as to have a resistance R2 which can be a function of R1 or be equal to R1. If R11 to R1N and R21 to R2N are configured and implemented similar to each other (e.g. R11 to R1N and R21 to R2N may be matched), the logic values provided from the digital logic DL can simultaneously adjust the two resistors R1 and R2 through control signals. Several switches and a decoder and/or another mechanism including switches etc. may then be used for adjusting the two resistors R1, R2. The specific decoding mechanism is not shown in detail. The correct value for R1 (and R2 respectively) may then be approximated according to a 1/x function. This is advantageous if the oscillator current IOSC is a linear function of the switching frequency FS. If the resistance values of each step of the approximation of R1 are then chosen according to a 1/x function, a minimum number of steps, taps, resistors and bits in the logic stage is required. In an aspect of the invention, also temperature variations of the resistance values may be compensated in the present embodiment, by trimming the resistors in response to the comparator results. The trimming procedure may then advantageously be performed in real time. The trimming range of the resistor is advantageously chosen so to cover frequency variations, process variations and/or temperature variations. The number N and size of the series resistors R11 to R1N and R21 to R2N may advantageously be chosen with respect to the required accuracy and the expected production spread. Furthermore, they may be chosen so as to comply with the above mentioned 1/x function.

The second resistor R2 (i.e. the series of resistors R11 to R1N) can be coupled to a voltage follower including, for example transistor M1 (NMOSFET) and an operational amplifier OPAMP. The positive input of the operational amplifier receives the input voltage VI multiplied with a constant gain or a damping factor KVIN. The input voltage at the positive input of operational amplifier OPAMP is advantageously only a fraction of the input voltage VI. This provides that the voltage drop across the second resistor R2 is also only a fraction of VI. The output of the operational amplifier OPAMP can then be coupled to a control gate of transistor M1 which may be coupled with a channel in series to resistor R2. The negative input of operational amplifier OPAMP may then be coupled to the source of transistor M1. Transistor M1 can then be controlled in response to input voltage VI. The drain of transistor M1 may then be coupled to receive a basically constant voltage level. The ramp current IR at the drain of transistor M1 can then be a function of the switching frequency FS and of the input voltage VI according to the above equation.

Figure 7:
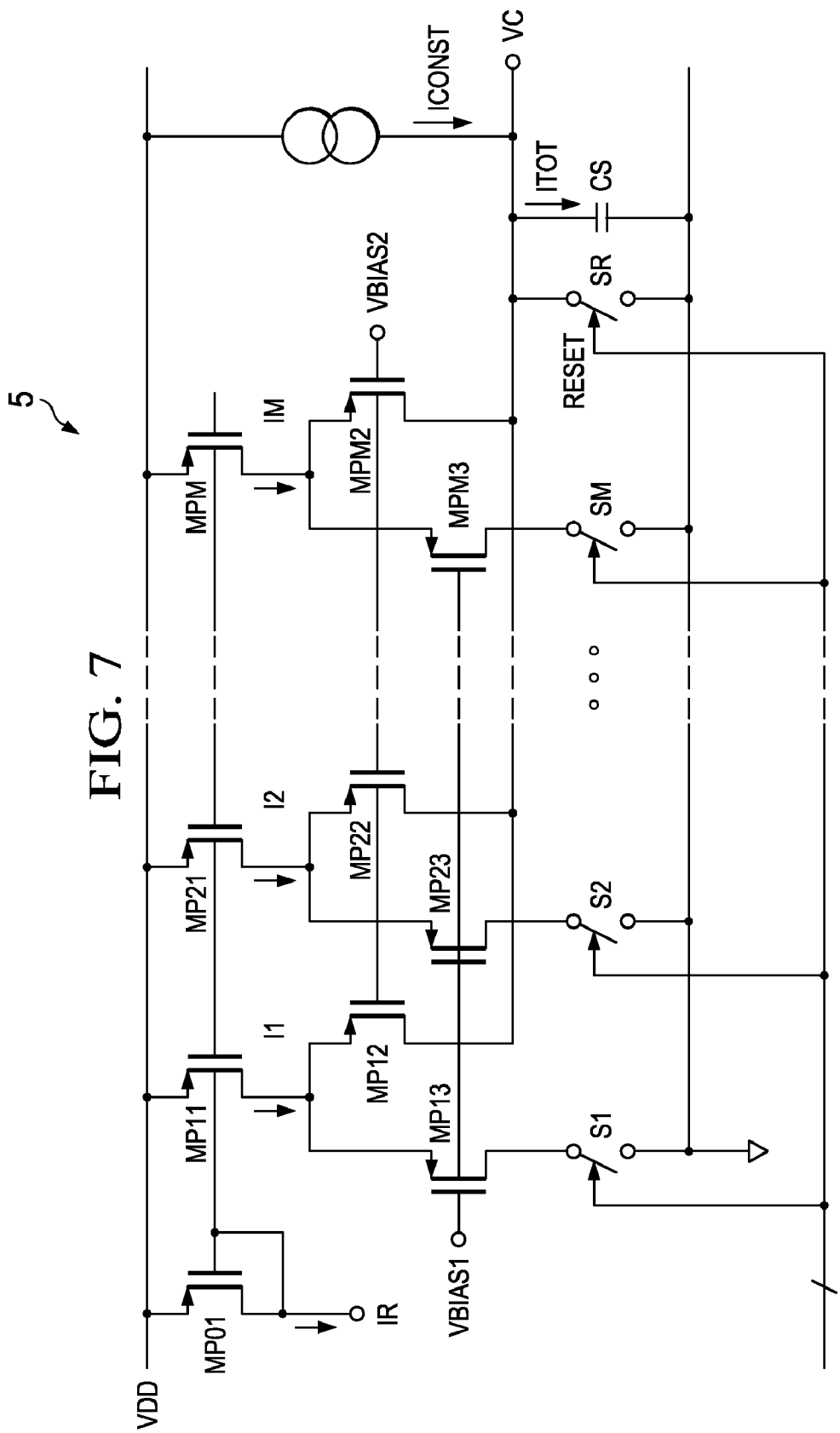
FIG. 7 shows a simplified circuit diagram of a piecewise linear current integrator that may be used in the embodiment of FIG. 4.

FIG. 7 shows a simplified circuit diagram of an embodiment of a stage 5 for providing that the slope compensation signal VC is also a function of the duty cycle. Stage 5 can be considered as piecewise linear integrator. The ramp current IR is multiplied through a number M of current sources and a capacitor CSLOPE is charged with the copied versions of the ramp current according to a timing scheme which is a function of the duty cycle D. M may be any number of separate current sources in accordance with the required resolution of the duty cycle, the precision of the approximation with piecewise linear sections. M may be 7, 10 or 30 if necessary.

The ramp current IR may be fed through current mirrors MP01, MP11, MP21, MPM to the unity current sources I1 to IM. Each current source I1 to IM may contribute the same amount of current to the total current ITOT for charging capacitor CS. The current source include cascade transistors MP13, MP12, MP23, MP22 to MPM3, MPM2 which receive constant bias voltages VBIAS1 and VBIAS at their gates for a glitch free switching. The current sources are controlled through switches S1, S2 to SM. There is also a reset switch SR coupled to discharge the capacitor CS after a complete period TS. The switches S1 to SM may be controlled with a thermometer coded signal from a digital logic which is not shown. The switching should be controlled in accordance with the number of current sources I1 to IM and the switching frequency FS. In this embodiment, the clock frequency (for switching the current sources) may be i+M times higher then the switching frequency FS. During each period TM=TS/(M+i), a current source may be switched on by turning on one of the switches S1 to SM. The parameter i may be 0 but it may also be 3 or 5. It indicates an initial period during which none of the current sources is used switched.

There may be a constant current source ICONST that may be used for charging capacitor CS during some first sub-cycles. ICONST may for example be used during the first three sub-cycles, i.e. for t<i*TM. Thereafter, during each cycle TM a current source T1 to TM may be switched on. The voltage level on capacitor CS may then be the slope compensation signal VC according to the above equations. After i cycles TM, the voltage VC rises quadratically in piecewise linear steps. The above formula for VC may then be written in a more general manner as $$VC(t) = \frac{VI\ FS}{2KFL\ RS}\left(\frac{t}{TS} - \frac{i}{M+i}\right)^2$$

In the embodiment of FIG. 7, i may be 3 and M may be 7.

Figure 8:
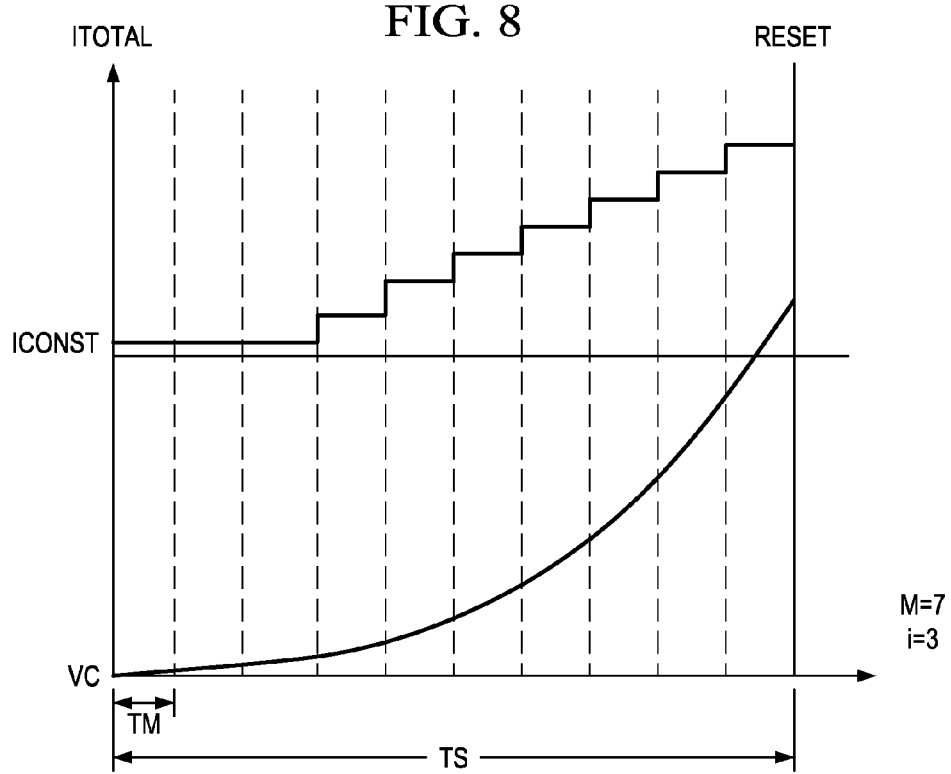
FIG. 8 shows waveforms of signals of the circuit of FIG. 7.

FIG. 8 is a diagram showing the resulting slope compensation voltage VC and the total current ITOT which charges CS according to a possible switching sequence of the circuit of FIG. 7, with i=3 and M=7. The sub-cycle TM is equal to one tenth of the total period TS=1/FS. In the upper part the total current ITOT is shown. During the first three sub-cycles TM only the constant current ICONST contributes to ITOT. After the third (i.e. after i sub-cycles) sub-cycle the first current source I1 is switched on and contributes to ITOT with a current that is proportional to the ramp current IR. The ramp current is a function of the switching frequency FS and the input voltage VI. With each further sub-cycle a further current source 12, 13 etc. is switched on and contributes a same amount of current to the total current ITOT. The slope compensation voltage VC on capacitor CS is therefore a piecewise linear approximation of a quadratic function in accordance with the above equation for VC. After a complete cycle TS, the circuit is reset, which means that CS is discharged.

The capacitor CS may advantageously be matched with the oscillator capacitor COSC of the oscillator 3 shown in FIG. 5. This can provide that errors due to capacitor mismatched are reduced or cancelled out.

In another embodiment, only a constant current source may be used, and capacitors may be switched instead.

Figure 9:
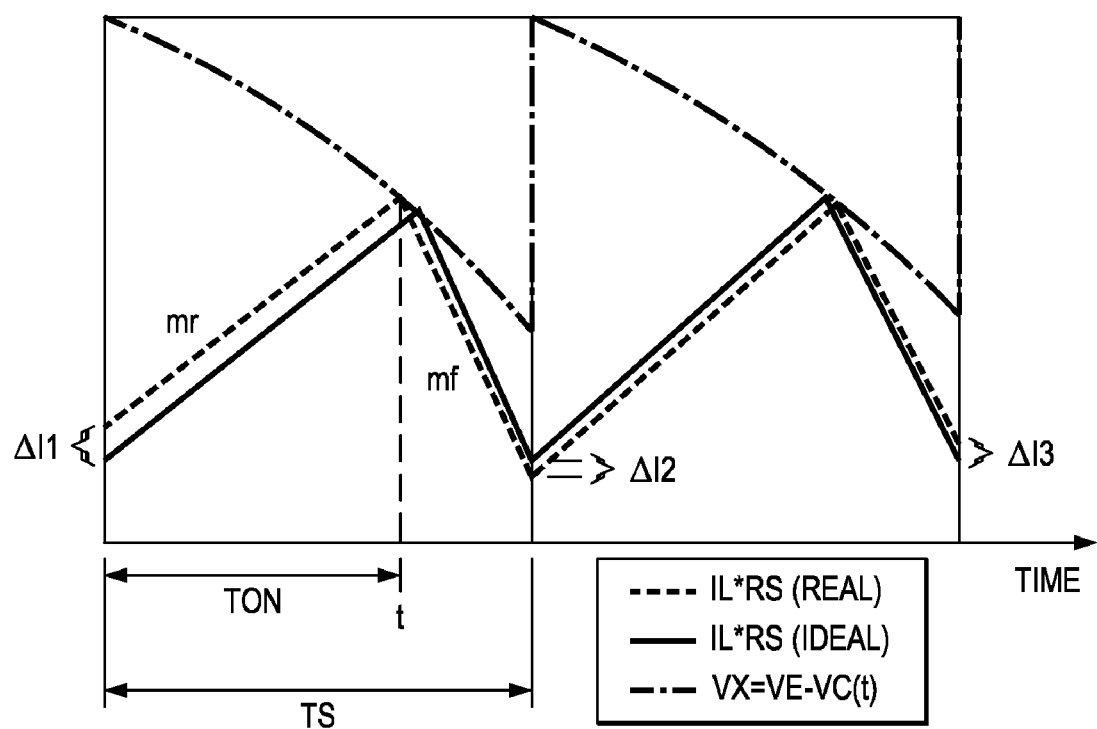
FIG. 9 shows waveforms of signals of the embodiment of FIG. 4.

FIG. 9 shows a simplified diagram of the sensed inductor current IL using a slope compensation according to aspects of the invention. The previously described embodiments of the invention may provide a signal VC which can be used to generate a signal VX=VE−VC as shown in FIG. 4. The real curve of IL*RS may differ from the ideal curve by an error ΔI1. The slope compensation through VX=VE−VC, VC being the piecewise linear approximation according to the aspects and embodiments of the invention provides that the error decreases although the duty cycle TON/TS is greater than 50%.

Although the present invention has been described in detail, it should be understood that various changes, substitutions and alterations can be made hereto without departing from the spirit and scope of the invention as defined by the appended claims.

The invention claimed is:

1. An electronic device comprising a DC-DC converter configured to switch an inductor current through an inductor using slope compensation, wherein the circuitry comprises a slope compensation stage configured to generate a slope compensation signal as a function of a switching frequency of the DC-DC conversion and an input voltage of the DC-DC converter, wherein the slope compensation stage is configured to generate a slope of the compensation signal as a function of the duty cycle of the DC-DC conversion so as to compensate varying values of the duty cycles.

2. The electronic device according to claim 1, wherein the switching frequency is derived from a current of an oscillator.

3. The electronic device according to claim 1, wherein the slope compensation stage is configured to adjust a resistor value in response to a magnitude of the oscillator current so as to provide an adjusted resistor.

4. The electronic device according to claim 3, wherein the compensation stage includes a voltage follower coupled with the adjusted resistor and configured to control a ramp current through the adjusted resistor in response to the input voltage.

5. The electronic device according to claim 4, wherein the slope compensation signal is generated with by charging a capacitor with a current that is a function of the ramp current.

6. The electronic device according to claim 1, wherein the compensation stage includes a voltage follower coupled with the adjusted resistor and configured to control a ramp current through the adjusted resistor in response to the input voltage.

7. The electronic device according to claim 1, wherein the compensation stage includes a voltage follower coupled with the adjusted resistor and configured to control a ramp current through the adjusted resistor in response to the input voltage.

8. The electronic device according to claim 2, wherein the compensation stage includes a voltage follower coupled with the adjusted resistor and configured to control a ramp current through the adjusted resistor in response to the input voltage.

9. The electronic device according to claim 3, wherein the slope compensation signal is generated with by charging a capacitor with a current that is a function of the ramp current.

10. A method of operating a DC-DC converter, the method comprising: switching a current through an inductor with a switching frequency, compensating a slope of the current through the inductor with a compensation signal which is a function of a switching frequency of the DC-DC converter and the input voltage of the DC-DC converter, wherein a slope of the compensation signal is also chosen so as to compensate varying values of the duty cycle.

* * * * *